United States Patent
Beck et al.

[11] Patent Number: 6,126,886
[45] Date of Patent: Oct. 3, 2000

[54] WIDE MOUTH HOT FILL CONTAINER

[75] Inventors: Martin H. Beck; George F. Rollend, both of Amherst; Robert J. Caldicott, Nashua, all of N.H.

[73] Assignee: DTL Technology Limited Partnership, Amherst, N.H.

[21] Appl. No.: 09/053,593

[22] Filed: Apr. 1, 1998

Related U.S. Application Data

[63] Continuation-in-part of application No. 08/833,794, Apr. 9, 1997, Pat. No. 6,062,408.

[51] Int. Cl.$^7$ .................................................. B29C 35/02
[52] U.S. Cl. ....................... 264/521; 264/523; 264/532; 264/533; 264/296; 264/904
[58] Field of Search ..................................... 264/521, 523, 264/532, 533, 296, 904

[56] References Cited

U.S. PATENT DOCUMENTS

| | | |
|---|---|---|
| 521,788 | 6/1894 | Flanigan . |
| 958,513 | 5/1910 | Love . |
| 1,770,548 | 7/1930 | Oven . |
| 2,340,353 | 2/1944 | Weaver . |
| 2,385,105 | 9/1945 | Samelson . |
| 2,423,295 | 7/1947 | Crabbe et al. . |
| 2,447,340 | 8/1948 | Jackson . |
| 2,456,560 | 12/1948 | Keith . |
| 2,852,054 | 10/1958 | Motley . |
| 2,961,119 | 12/1960 | Leach . |
| 3,038,624 | 6/1962 | Wieckmann . |
| 3,065,677 | 11/1962 | Loeser . |
| 3,171,458 | 3/1965 | Strong . |
| 3,200,981 | 8/1965 | Harding . |
| 3,243,851 | 4/1966 | Reittier, Jr. et al. . |
| 3,250,417 | 5/1966 | Powers, Jr. et al. . |
| 3,272,369 | 9/1966 | Grimsley . |
| 3,285,452 | 11/1966 | Moloney et al. . |
| 3,286,866 | 11/1966 | McIntosh . |
| 3,339,770 | 9/1967 | Weigand . |
| 3,343,700 | 9/1967 | Heubl . |
| 3,344,942 | 10/1967 | Hedgewick . |
| 3,348,717 | 10/1967 | Treanor . |
| 3,352,127 | 11/1967 | Skinner, Sr. . |
| 3,352,448 | 11/1967 | Livingstone . |
| 3,374,913 | 3/1968 | Zipper . |
| 3,405,439 | 10/1968 | Uemura . |
| 3,418,409 | 12/1968 | Hesse et al. . |
| 3,460,703 | 8/1969 | Leftault, Jr. . |
| 3,482,725 | 12/1969 | Exton . |
| 3,532,786 | 10/1970 | Coffman . |
| 3,557,275 | 1/1971 | Longshaw et al. . |
| 3,557,985 | 1/1971 | Denis . |
| 3,567,233 | 3/1971 | Stepanich . |
| 3,612,324 | 10/1971 | Malick . |
| 3,613,929 | 10/1971 | Treanor . |
| 3,784,041 | 1/1974 | Birch . |
| 3,820,799 | 6/1974 | Abbes et al. . |
| 3,861,551 | 1/1975 | Hannon . |
| 4,016,996 | 4/1977 | Aichinger et al. . |
| 4,069,937 | 1/1978 | Smalley . |

(List continued on next page.)

FOREIGN PATENT DOCUMENTS

| | | |
|---|---|---|
| 140719 | 5/1985 | European Pat. Off. .............. 264/521 |
| 8-47970 | 2/1996 | Japan . |

*Primary Examiner*—Mathieu D. Vargot
*Assistant Examiner*—Suzanne E. McDowell
*Attorney, Agent, or Firm*—Davis and Bujold

[57] ABSTRACT

A method of forming a wide mouth blow molded thermoplastic container comprising the steps of i) stretch blow molding from a preform, an intermediate article defining the container with the mouth being threaded and/or flanged, the mouth terminating in an accommodation element having a neck finish that supports the preform in the blow mold; ii) heat setting the intermediate article including the entire container while still in the mold, and iii) removing the intermediate article of manufacture from the mold and severing the accommodation element to produce the container, and an article when made by the method. The method also includes post forming of a rim portion of the container following separation of the container from the accommodation element.

10 Claims, 4 Drawing Sheets

U.S. PATENT DOCUMENTS

| | | |
|---|---|---|
| 4,090,631 | 5/1978 | Grussen . |
| 4,091,948 | 5/1978 | Northup . |
| 4,141,463 | 2/1979 | Smith . |
| 4,143,785 | 3/1979 | Ferrell . |
| 4,153,172 | 5/1979 | Bialobrzeski . |
| 4,196,818 | 4/1980 | Brownbill . |
| 4,202,462 | 5/1980 | Imber . |
| 4,206,852 | 6/1980 | Dunn et al. . |
| 4,209,102 | 6/1980 | Dunn et al. . |
| 4,210,251 | 7/1980 | Grussen . |
| 4,218,067 | 8/1980 | Halling . |
| 4,253,581 | 3/1981 | Aichinger et al. . |
| 4,257,525 | 3/1981 | Thompson . |
| 4,274,544 | 6/1981 | Westfall . |
| 4,281,774 | 8/1981 | Mumford . |
| 4,281,979 | 8/1981 | Doherty et al. . |
| 4,290,614 | 9/1981 | Moll . |
| 4,343,408 | 8/1982 | Csaszar . |
| 4,345,692 | 8/1982 | Obrist et al. . |
| 4,360,114 | 11/1982 | Owens . |
| 4,360,149 | 11/1982 | Hein, Jr. . |
| 4,385,089 | 5/1983 | Bonnebat et al. ............ 264/904 |
| 4,386,044 | 5/1983 | Arndt et al. . |
| 4,392,579 | 7/1983 | Uhilg et al. . |
| 4,394,918 | 7/1983 | Grussen . |
| 4,418,828 | 12/1983 | Wilde et al. . |
| 4,442,947 | 4/1984 | Banich, Sr. . |
| 4,470,513 | 9/1984 | Ostrowsky . |
| 4,475,274 | 10/1984 | Beckstrom et al. . |
| 4,497,765 | 2/1985 | Wilde et al. . |
| 4,506,795 | 3/1985 | Herr . |
| 4,550,844 | 11/1985 | Lininger . |
| 4,552,279 | 11/1985 | Mueller et al. . |
| 4,559,197 | 12/1985 | Dick et al. ............ 264/296 |
| 4,563,325 | 1/1986 | Coffman . |
| 4,576,843 | 3/1986 | Beck et al. ............ 264/532 |
| 4,595,547 | 6/1986 | Herr . |
| 4,665,682 | 5/1987 | Kerins et al. ............ 264/532 |
| 4,796,766 | 1/1989 | Clark ............ 264/532 |
| 4,856,667 | 8/1989 | Thompson . |
| 4,867,929 | 9/1989 | Albrecht et al. ............ 264/296 |
| 5,115,938 | 5/1992 | Thompson ............ 220/618 |
| 5,181,615 | 1/1993 | Thompson ............ 220/618 |
| 5,429,777 | 7/1995 | Nilsson ............ 264/296 |
| 5,697,514 | 12/1997 | Hekal ............ 220/610 |

WIDE MOUTH HOT FILL CONTAINER

This is a continuation-in-part application of U.S. application Ser. No. 08/833,794 filed Apr. 9, 1997, now U.S. Pat. No. 6,062,408.

FIELD OF INVENTION

This invention relates, in general, to new and useful improvements in plastic containers, and more particularly to a polyester wide mouth container wherein the entire container is biaxially oriented and may be heat set from an injection molded preform using a stretch blow molding process to provide the strength necessary in the packaging of hot ingredients, with provision for post forming features of the container.

BACKGROUND OF THE INVENTION

Wide mouth plastic containers for hot ingredients, in particular containers made of polyethylene terephthalate (PET), are commercially available. These PET containers typically are formed from a wide mouth preform using conventional blow molding techniques. The wide mouth container formed by such a the conventional blow molding process, results in a container having a neck of insufficient strength and thickness in comparison with the rest of the container. This is because with conventional blow molding techniques preforms that have threads already formed in the preform are used. In such preforms, if they are to be utilized substantially in their entirety, as is now customary in bottle forming, the diameters of the mouth of the preform must match that of the resultant container and the blow molding of the preform will result in insufficient biaxial orientation of the container particularly in the container body wall adjacent the open mouth.

A heat setting process helps to alleviate potential shrinkage and distortion, however, the finish of a conventionally blown wide mouth container is not exposed to this heat setting process.

It has also been proposed (U.S. Pat. No. 4,576,843) to create a wide mouth container using a preform with a small diameter preform as is customarily utilized in the blow molding of bottles with the preform being of a materially lesser length than that of the resultant container. Here there is formed an intermediate article of manufacture which has a portion in the form of an accommodation element which permits the necessary biaxial orientation of the thermoplastic material throughout the container, the accommodation element being severed from the container and becoming reusable scrap. This technology results in preforms having a flanged portion where the resultant trimming typically takes place. The trimming results in a wide mouth container biaxially oriented throughout with a flange as its neck portion. This flange is used to attach a lid for holding the contents within the container. The present technology does not provide a hot fillable wide mouth container which resists shrinkage and distortion at hot fill temperatures greater than 160° F.

An object of this invention is to provide a wide mouth container blow molded from a small diameter preform (as opposed to a parison used in extrusion blow molding), as is customarily utilized in the stretch blow molding of bottles, wherein the entire container, including the neck finish, is biaxially oriented and heat set to give thermal stability to the entire container.

Another object is to provide a method of post forming (i.e. post formation of the container by blow molding) neck finish features of the container.

Another object is to provide a wide mouth container having a screw thread formed during the blowing operation.

Another object is to increase the geometric strength of the container by curling the edges of the finished container, so that the container is better able to withstand distortion and shrinkage. This acts as a safety lip for drinking from the container and a means of providing a "snap" cap when made without blown threads.

SUMMARY DESCRIPTION OF THE INVENTION

The present invention utilizes the stretch blow molding of a preform to produce a heat set biaxially oriented container which cannot be produced by the blow molding from an extruded parison which does not produce biaxial orientation or heat setting.

According to the invention there is provided a method of forming a wide mouth blow molded biaxially oriented heat set thermoplastic container comprising the steps of i) stretch blow molding from a preform, an intermediate article comprising the container with the mouth of the container terminating in an accommodation element having a neck that supports the preform in a mold; ii) removing the intermediate article of manufacture from the mold and severing the accommodation element to produce the biaxially oriented container, and iii) subsequently heating the material of the container adjacent the open mouth until workable and then post forming by rolling the material adjacent the open mouth to form a curled perimeter defining the open mouth.

According to the invention there is provided a method of forming a wide mouth blow molded biaxially oriented heat set thermoplastic container comprising the steps of i) stretch blow molding from a preform, an intermediate article comprising the container with the mouth of the container terminating in an accommodation element having a neck that supports the preform in a mold; ii) heat setting the intermediate article including the entire container in the mold, and iii) removing the intermediate article of manufacture from the mold and severing the accommodation element to produce the biaxially oriented heat set container.

Also according to the invention there is provided a method of forming a wide mouth blow molded thermoplastic container having a screw thread formed adjacent the mouth comprising the steps of i) supporting a preform in a blow mold by a preform neck finish, the mold having a cavity defining the outer shape of the container including the thread; ii) without exceeding about 300° F., heating the thread forming portion of the cavity to from about 25° F. to about 100° F. above the temperature of the remainder of the cavity; iii) stretching the preform longitudinally using an extendable stretch rod; iv) blowing the preform to form an intermediate article comprising the container, having blow molded threads connected to the neck finish by an accommodation element, and v) following removal of the intermediate article from the mold, severing the container from the accommodation element.

Also according to the invention there is provided a container when made by the methods of the invention.

BRIEF DESCRIPTION OF THE DRAWING

The invention will now be described, by way of example with reference to the accompanying drawings, in which.

DETAILED DESCRIPTION OF PREFERRED EMBODIMENTS

Referring now to the drawings in detail, it will be seen that there are illustrated embodiments of a wide mouth container formed by blow molding. The container 1 (FIGS. 3 and 7), has a cylindrical body 2 and a base 3 of the modified champagne type so as to resist internal pressures. The upper part of the body 2 terminates in a wide mouth 4 adapted to have attached thereto any one of many conventional types of closure. The container material preferably is PET (polyethylene terephthalate) or other suitable polyester.

Figure 1:
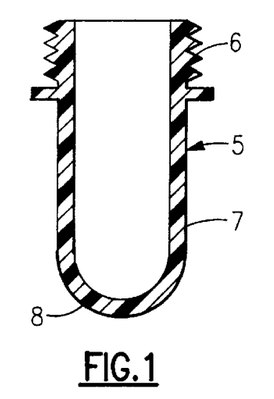
FIG. 1 is a sectional view through a preform which is utilized in accordance with this invention to form the container of FIG. 3.
Figure 2:
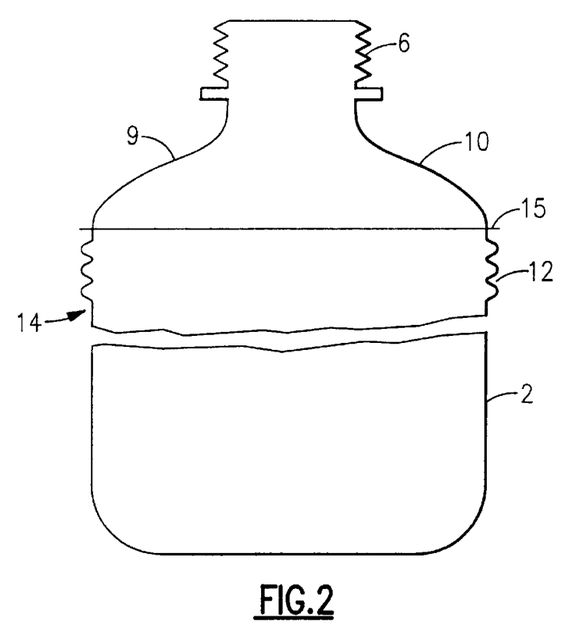
FIG. 2 is an elevation depicting an intermediate article of manufacture formed from the preform of FIG. 1 utilizing blow molding techniques in accordance with the invention.

In accordance with the invention, it is desirable to utilize a conventional preform configuration such as the preform 5 illustrated in FIG. 1. Basically, the preform comprises a neck portion 6 used to support the preform in a mold during a subsequent blowing operation, a generally cylindrical body portion 7 and a hemispherical bottom portion 8. The preform once blown forms an intermediate article as depicted in FIG. 2. The intermediate article comprises an open neck 6, substantially unchanged from the preform, terminating in a tapered transition portion 9 that increases in diameter to the diameter of the desired wide mouth container 1. The neck 6 and tapered portion 9 will, hereafter, be referred to as the accommodation element 10. From the accommodation element 10 extends a generally cylindrical body 2, which terminates in a closed base 3 of any desired shape. However a champagne bottle shaped base is preferred.

Figure 5:
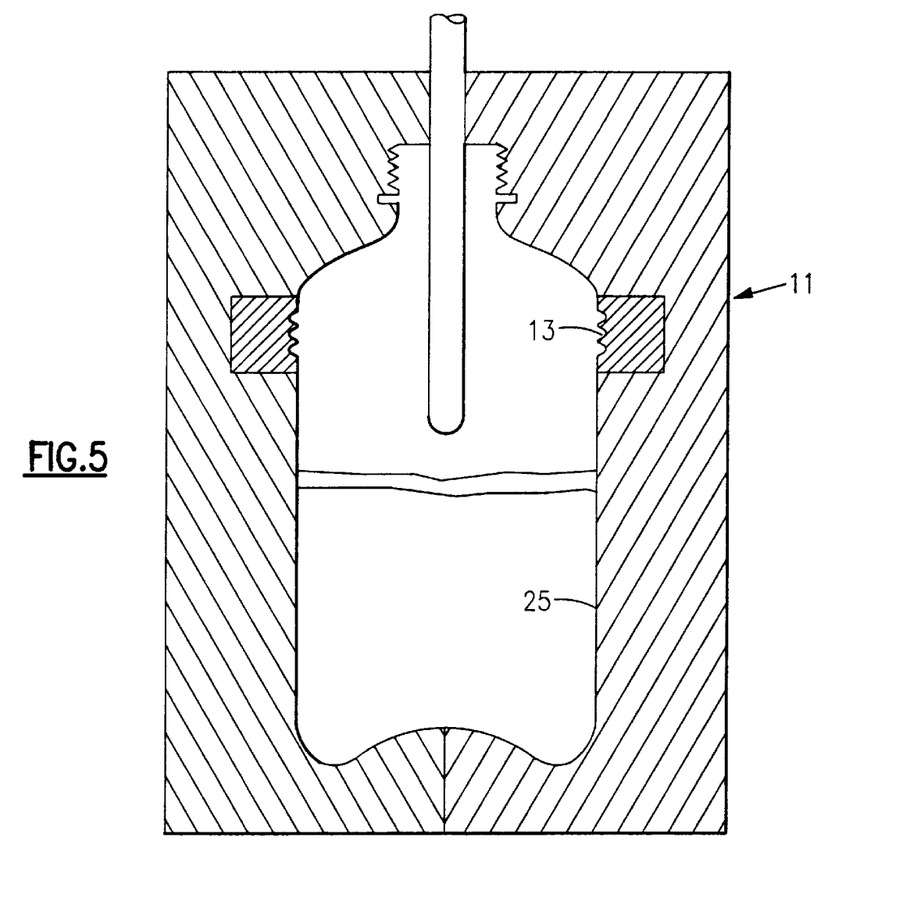
FIG. 5 is a diagrammatic sectional view of the mold used in forming the intermediate article of FIG. 2.

The preform is temperature conditioned to prepare it for subsequent blowing operations. Appropriate temperature conditioning requires heating the preform to the point where increased workability of the preform is established. Next, the PET is placed in a blow mold 11 supported by the neck 6. An extendable stretch rod is then used to longitudinally stretch the preform to provide sufficient longitudinal (axial) orientation of the PET. While the preform is being stretched to the desired longitudinal extent and/or, thereafter, the blowing operation begins to create the hoop orientation.

The surface of the PET preform is typically temperature conditioned to a temperature of from about 185° F. to about 220° F. for conventional blow molding and from about 220° F. to about 250° F. if heat setting is required in the mold. The mold is maintained at about 40° F. to about 55° F. for conventional blow molding and from about 180° F. to about 250° F. where heat setting is required. At the end of the blow molding and, if appropriate, heat setting cycle, the container is cooled with cool air to stabilize the blown container prior to removal from the blow mold.

The residence time in the blow mold ranges from 3.0 to 4.5 seconds from commencing stretching and blowing of the preform to the mold being opened for removal of the blown container.

Difficulty exists in the formation of a blown screw thread 12 and a typically heated mold will not provide for satisfactory thread formation during the blowing operation. It is, therefore, appropriate to include a selectively temperature controlled portion 13 of the cavity of the blow mold to selectively control the temperature in the region in which threads are to be formed. The selective temperature control is used to increase the temperature of the mouth defining portions of the cavity from about 25° F. to about 100° F. higher than the remainder of the cavity 25 while not exceeding 300° F. Due to the increased temperature in the thread forming portion 13 of the cavity, the preform becomes less viscous in this area which allows sufficient material flow during blowing operations to ensure satisfactory formation of the threads and biaxial orientation of the material forming the screw threads 12.

The stretching and blowing of the preform to form the intermediate article 14 ensures that the wide mouth container 1 is biaxially oriented in its entirety. Due to longitudinal stretching and subsequent circumferential stretching, the container achieves sufficient biaxial orientation to provide desired structural integrity and strength.

Figure 3:
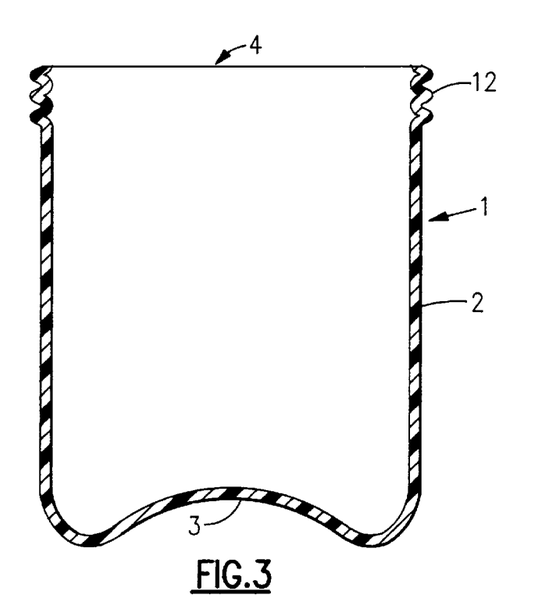
FIG. 3 is a sectional view of a threaded wide mouth container which is formed in accordance with the invention.

The intermediate article is intermediate in the sense that, once removed from the mold, severing of the accommodation element 10 from the intermediate article 14 is required to finally form the wide mouth container 1 (FIG. 3). The resultant wide mouth container 1 has consistent biaxial orientation and heat set throughout including the mouth portion 4 with the formed screw threads 12.

In a preferred embodiment, particularly for hot fill wide mouth containers, the intermediate article 14 is heat set in the mold. A container without heat setting is susceptible to shrinkage and distortion when used to store hot food items with fill temperatures greater than 160° F. Of critical importance is the ability to heat set the entire container. According to the present invention the entire container including the mouth 4 is heat set. The heat setting operation occurs when the intermediate article 14 is blown in the mold and is exposed to a temperature from about 180° F. to about 250° F. for about 3 seconds to about 4.5 seconds). This heat setting of the intermediate article ensures that the entire container including the mouth 4 is heat set. This produces crystallinity and stress relief in the entire wide mouth container. As a result of the blowing and heat setting operations, the container including screw threads 12 is increased in strength and less likely to shrink and distort when hot filled with food items.

Once the intermediate article 14 is removed from the mold, the accommodation element 10 is severed from the intermediate article 14 resulting in the wide mouth container 1. In the embodiment of FIG. 3, the mouth portion 4 comprises screw threads 12, and the container is sealed by way of a screw threaded closure after hot filling. The mouth may first be closed by a foil induction seal. Heat setting enhances the adhesion of the induction seal closure to the mouth.

Figure 6:
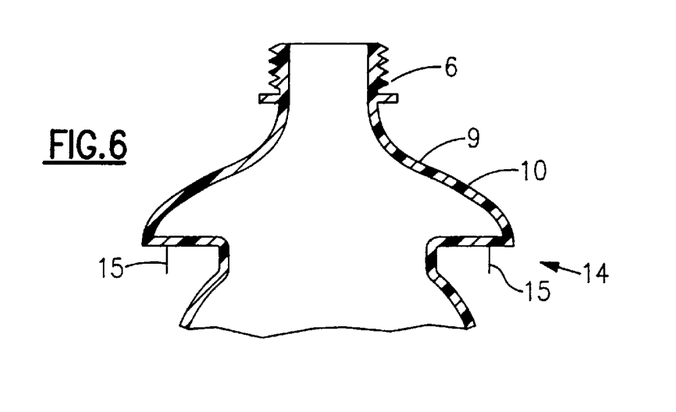
FIG. 6 is a fragmentary sectional view depicting an intermediate article of manufacture, which is formed in accordance with the invention, in which the mouth of the container comprises a flange.
Figure 7:
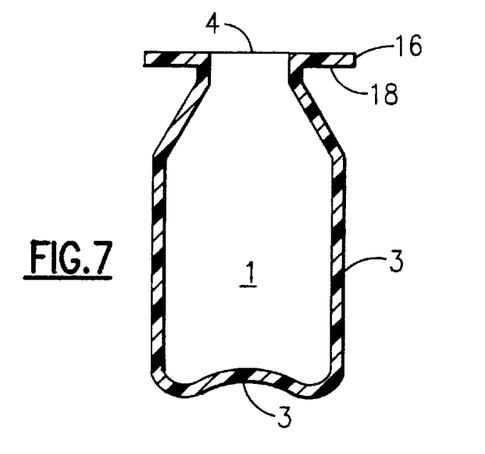
FIG. 7 is a sectional view depicting the container once the accommodation element, shown in FIG. 6, is severed.

With reference now to FIG. 7, a wide mouth hot fill container 1 has a mouth finish in the form of a radially outwardly extending flange in place of the threads of the first embodiment illustrated in FIG. 3. This container is produced from an intermediate article, a portion of which is illustrated in FIG. 6, with the accommodation element 10 removed at a cut line 15 thereby defining the outer periphery of the flange. As with the first embodiment, heat setting of the intermediate article results in the entire finished container being heat set, thereby ensuring that the flange area is crystallized and stress relieved to improve its resistance to shrinkage and distortion and to provide enhanced adhesion for an induction seal closure of the mouth.

Figure 4:
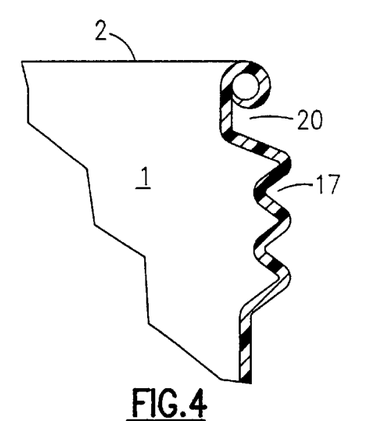
FIG. 4 is a fragmentary sectional view of a wide mouth container which is formed in accordance with the invention, with a curled flange defining the mouth.

It will be appreciated that a combination of the blown threads of the first embodiment and a flange can be utilized as shown in FIG. 4. In this connection, the flange would normally be rolled outwardly from the axis of the container. The flange could also be inwardly turned in both embodiments described herein.

As seen in FIG. 4, the threaded portion of the container has a thickness of from about 0.015 inches (0.38 mm) to about 0.060 inches (1.52 mm), preferably from about 0.030 inches (0.76 mm), the sidewall of the container has a thickness, after transition from the threaded portion, of from about 0.010 inches (0.25 mm) to about 0.020 inches (0.51 mm), preferably about 0.015 inches (0.38 mm), and the flange portion, between the threaded portion and the mouth, has a thickness of from about 0.009 inches (0.23 mm) to about 0.030 inches (0.76 mm), preferably about 0.018 inches (0.46 mm). These changes in thickness in the container may be achieved by appropriately varying the temperature of portions of the preform in preparation for blow molding.

Figure 8A:
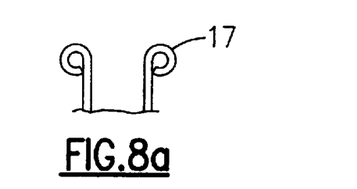
FIGS. 8a, 8b and 8c are sectional views of an edge of the container with various finishes.
Figures 8B, 8C:
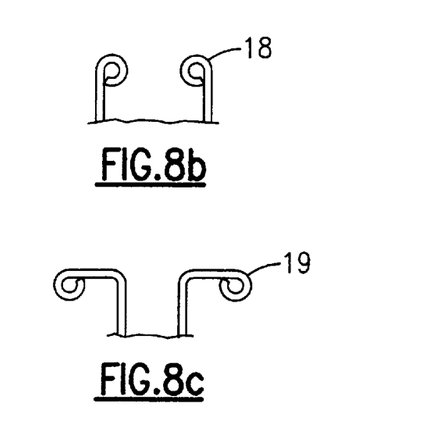
Figure 9A:
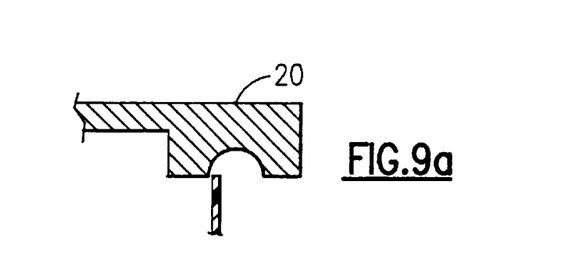
FIGS. 9a, 9b and 9c are sectional view of a curling die utilized to finish the edge of the container depicting progressive phases of operation.
Figure 9B:
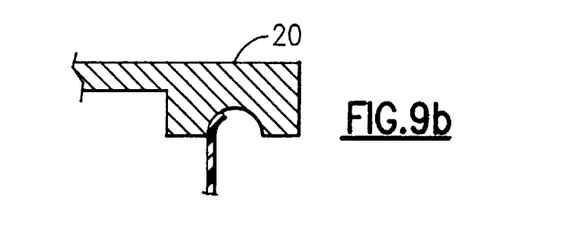
Figure 9C:
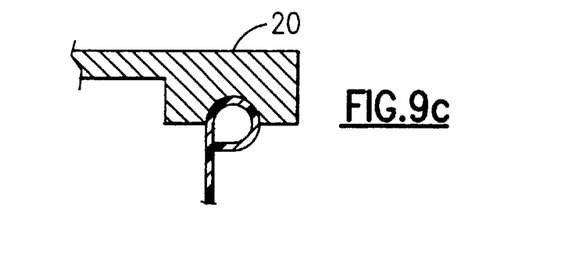

In a preferred embodiment the edge of the mouth 4 is further processed to include curling the edge for increased strength. The edge 16 of the wide mouth container 1 created after the severing of the accommodation portion 10 of the intermediate container 14 can be subjected to further processing. The further processing includes providing a finish on the edge 16 of the wide mouth container 1. As depicted in FIGS. 8a, 8b and 8c, the finish could comprise an outward roll 17, an inward roll 18 or a modified flattened roll 19. Production of the curled finish is a function of time, temperature, pressure and tool configuration. This is accomplished once the temperature allows for workability of the edge, by feeding the edge at a predetermined rate into a curling die 20 (FIGS. 9a, 9b and 9c) to apply a predetermined pressure so that the flexible edge follows the form of the die and continues to loop around until the desired finish is reached. Various dies can be utilized resulting in numerous finishes.

Although curling of edges is not new in plastic cups, it has not previously been used to curl the edges of biaxially oriented containers or in biaxially oriented heat set containers. Forming the curl advantageously relaxes the material's memory in the area of the curl as a result of the applied heat which anneals the material and tends to render this area amorphous and partly crystallized although not necessarily to the point where the material turns white as a result of the crystallization.

In a preferred construction the container defines a radially inwardly extending curl (see FIG. 8b).

The rolled flange of FIG. 4 may have an outside diameter of about 1.95 inches (4.95 cm) with the root diameter of the threads being about 2.00 inches (5.08 cm).

According to further embodiments, the wide mouth 4 of the container 1 may be post formed to provide a desired neck finish and/or shape and/or patterns adjacent the mouth. It will be appreciated that in these embodiments, as well as in the embodiments described above, the horizontal cross-section of the container may be circular with a circular mouth or may have other cross-sections and shapes.

Figure 10:
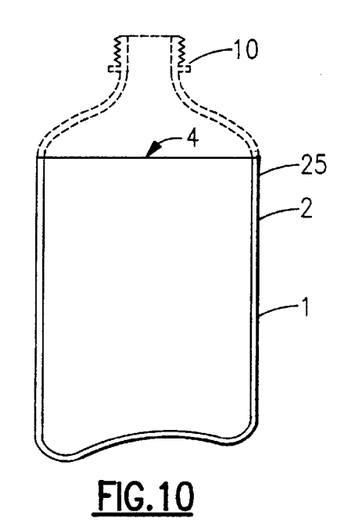
FIGS. 10–13 illustrate various aspects of post forming features in a container made from an intermediate article comprising the container and an accommodating element.

FIG. 10 illustrates a blow mold container after removal of an accommodation element 10 (shown dashed) to form a wide mouth container 1 with a wide mouth 4 defined by a cylindrical rim portion 25 of the body 2 prior to post forming of this rim portion into an outwardly rolled flange such as shown in FIG. 4.

The container 1 is biaxially oriented and preferably is heat set in its entirety.

Figure 11:
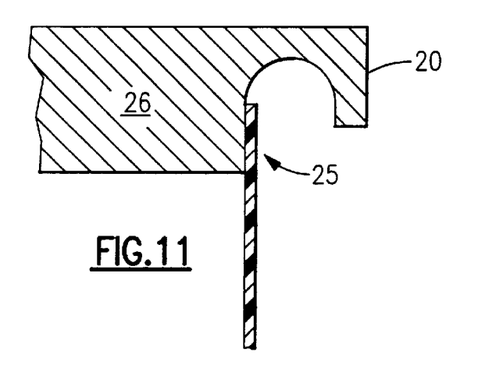

Referring to FIG. 11, rim portion 25 is supported by a mandrel 26, located inside the mouth 4, which supports a curling die 20. The mandrel 20 prevents the rim portion 25 from shrinking toward the diameter of the preform 5 as the rim portion is heated preparatory to forming the curl or other rim features. This potential shrinkage is due to the "shape memory" or hysterisis of the plastic (e.g. PET) from which the container is made. Axial shrinkage also tends to occur and this can be accommodated by dimensional control to allow for the shrinkage or by axially restraining the container.

Prior to post forming a curled rim (see the steps of FIGS. 9a, 9b, 9c) the rim portion 25 is heated to above the glass transition temperature Tg of the plastic (c. 180° F. for PET) within a range, for PET, of about 180° F. to about 350° F. preferably to about 200° F. The die 20 and rim portion are then moved together axially of the container to produce a curled rim such as seen in FIG. 4. In the case of a circular mouth 4 the mandrel 26/die 20 and the container may be rotated relative to one another to facilitate curl formation. Curls in excess of 360° in cross-section can be produced in this manner. Following formation of the curl, the rim portion 25 is cooled and the mandrel 26/die 20 removed leaving the curled neck finished of the open mouth 4. The cycle time for curl formation is typically from 0.5 to 5 seconds per container.

Figure 12:
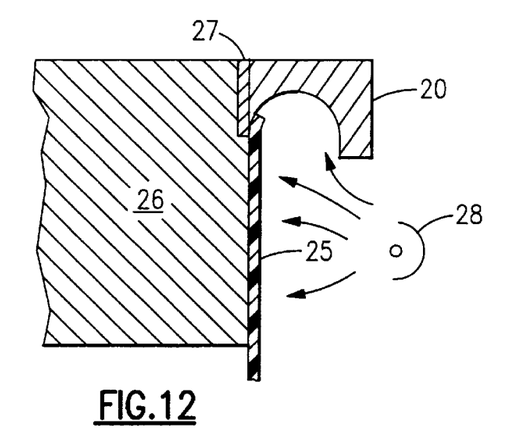

Only the material to be curled needs to be heated to or above Tg and to this end the mandrel 26/die 20 may have a structure as shown in FIG. 12 in which the die 20 is heated (e.g. electrically) and the mandrel 26 is cooled (e.g. water cooled) with a layer of insulation 27 separating them. Pre-heating of the rim portion 25 may be provided by a further heat source (e.g. a radiant heat source 28).

The heating of the rim portion above Tg may be sufficient (up to 350° F. for PET) to increase crystalinity of the neck finish thereby to improve thermal performance, stiffness and rigidity of the neck finish.

In alternative arrangements, the die 20 can sequentially heat and cool the rim portion 25 during curl formation.

Figure 13:
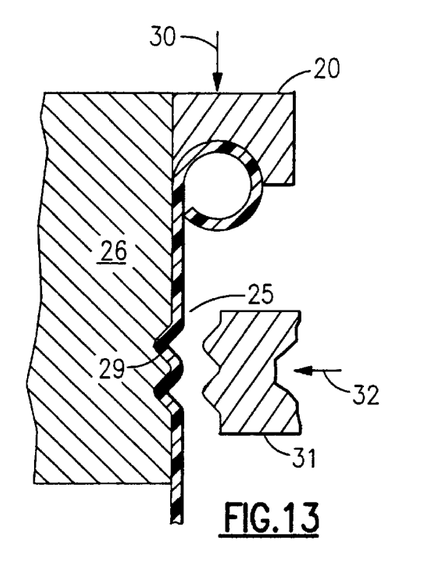

Other post forming operations may also be performed on the rim portion 25 of the container either together with curl formation or independently thereof. Such an operation is illustrated in FIG. 13 in which shaped features (e.g. threads) or patterns are formed in the rim portion 25 by die features 29. Here the die 20 is moved in the direction of arrow 30 relative to the mandrel 26 to form a curl which the rim portion 25 shrinks into the die features 29 by virtue of its "shape memory". The formation of the rim portion by the die features 29 may be assisted by a mating die 31 moved in the direction of arrow 32 relative to the mandrel 26 and/or by the use of additional heat. As appropriate, the mating die may be a roller die which is rotated about the rim portion 25.

In this manner internal and/or external threads and other shape features or patterns may be formed in the rim portion 25 or, indeed, in other portions of the container 1.

With typical blow molding hot fill wide mouth PET containers, according to the present invention, are thermally stable with hot fills to about 185° F. to about 200° F. The post forming described above can extend this thermal stability up to about 250° F. by heating the entire container to above the Tg of PET while the post forming is taking place thereby to provide a heat set secondary to that in the blow mold.

What is claimed is:

1. A method of forming a wide mouth blow molded biaxially oriented thermoplastic container comprising the steps of i) stretch blow molding from a preform, an intermediate article comprising the container with the mouth of the container terminating in an accommodation element having a neck that supports the preform in a mold; ii) removing the intermediate article from the mold and severing the accommodation element to produce the biaxially oriented container, and iii) subsequently heating the material of the container adjacent the open mouth until workable and then post forming by rolling the material adjacent the open mouth to form a curled perimeter defining the open mouth; wherein the open mouth is restrained from undesired hoop dimensional changes by a mandrel, located in the open mouth, during the heating and post forming, the mandrel defines shade features permitting shape memory of the material heated in preparation for post forming to change shape to at least in part form the shape features, and a mating die having die features in conformance with the shape features is provided to supplement the shape memory's action to conform the material to the shape features.

2. The method of claim 1, wherein the thermoplastic is PET and the post forming is carried out at a temperature of from about 180° F. to about 350° F.

3. The method of claim 1 wherein the open mouth is defined by a rim portion and this rim portion is heated and rolled to form the curled perimeter defining the open mouth and to anneal the material of the curled perimeter.

4. The method of claim 1 comprising the step of forming container features during post forming the container adjacent the container mouth.

5. The method according to claim 1, wherein the curled perimeter is produced by rolling the material adjacent the open mouth to form a curl facing one of inwardly and outwardly of the open mouth.

6. The method of claim 1 wherein the shape features form at least one of internal threads, external threads, intaglio patterns, raised patterns, and surface appearance features.

7. The method of claim 1 wherein the material heated in preparation for post forming is heated sufficiently to crystalize the post formed material.

8. The method of claim 1 comprising the step of axially restraining the container during heating in preparation for post forming and during post forming to restrain the container from undesired axial dimensional changes.

9. A method of forming a wide mouth blow molded biaxially oriented thermoplastic container comprising the steps of i) stretch blow molding from a preform, an intermediate article comprising the container with the mouth of the container terminating in an accommodation element having a neck that supports the preform in a mold; ii) heat setting the intermediate article including the entire container while in the mold; iii) removing the intermediate article from the mold and severing the accommodation element to produce the biaxially oriented container; and iv) subsequently heating the material of the container adjacent the open mouth until workable and then post forming by rolling the material adjacent the open mouth to form a curled perimeter defining the open mouth; the entire container being heated during post forming to a temperature exceeding the glass transition temperature of the material to produce a secondary heat set of the container thereby to increase the useful operating temperature range of the container.

10. The method of claim 9 wherein the heat setting in the mold is at a temperature of at least about 180° F. for a cavity residence time of about 3 seconds to about 4.5 seconds.

* * * * *

UNITED STATES PATENT AND TRADEMARK OFFICE
CERTIFICATE OF CORRECTION

PATENT NO. : 6,126,886
DATED : October 3, 2000
INVENTOR(S) : Martin H. BECK, George F. ROLLEND and Robert J. CALDICOTT It is certified that error appears in the above-identified patent and that said Letters Patent is hereby corrected as shown below:

Column 7, line 25, "shade" should be --shape.--.

Signed and Sealed this

First Day of May, 2001

*Attest:*

NICHOLAS P. GODICI

*Attesting Officer*    Acting Director of the United States Patent and Trademark Office